United States Patent Office 3,193,099
Patented July 6, 1965

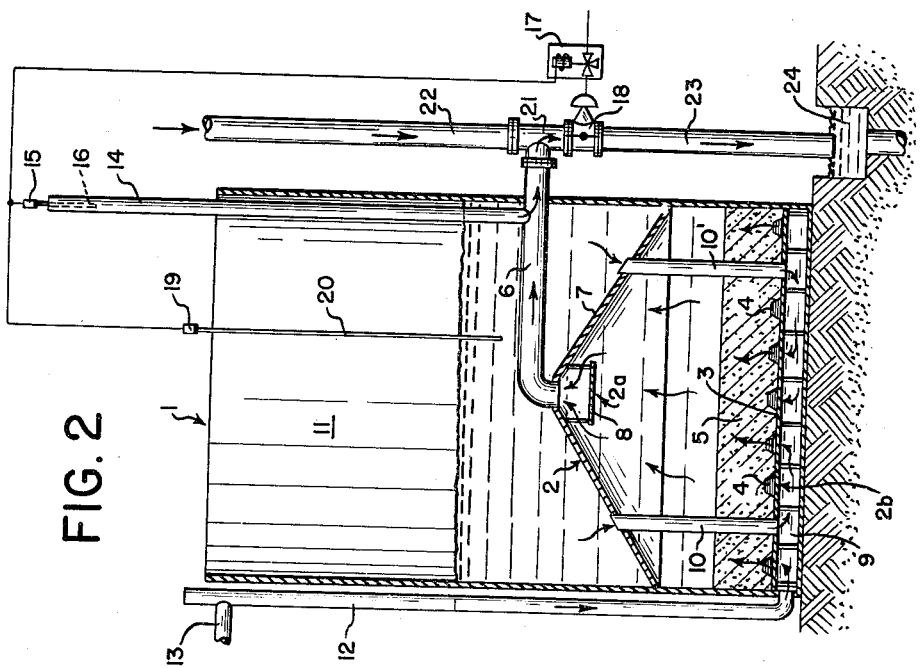
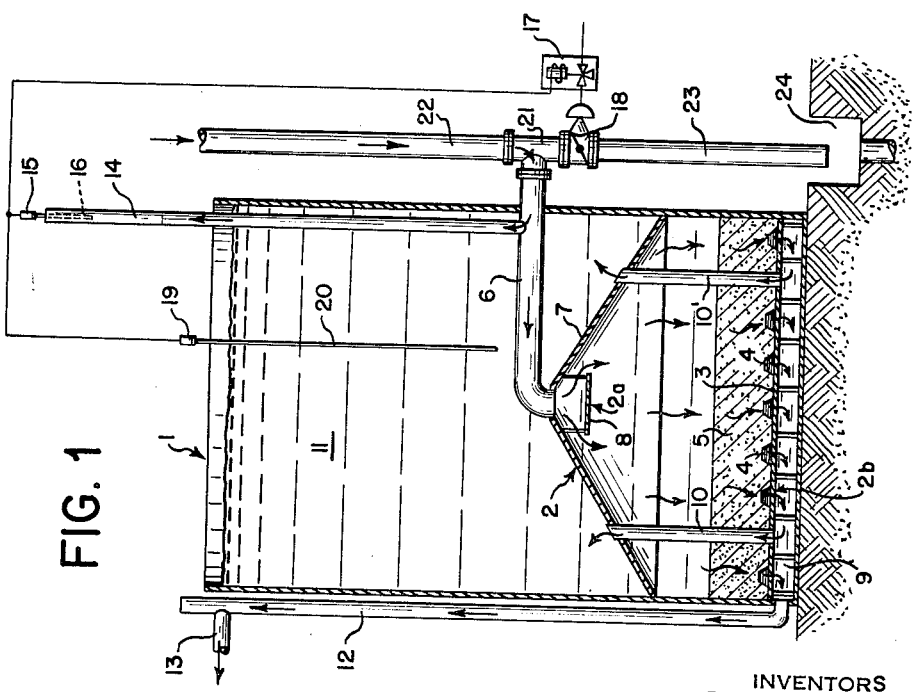

3,193,099
MONOVALVE FILTER
Alfonse Joseph Soriente, Gillette, and Joseph H. Duff, Elizabeth, N.J., assignors to Union Tank Car Company, Chicago, Ill.
Filed Aug. 30, 1961, Ser. No. 134,884
11 Claims. (Cl. 210—99)

This invention relates to filters of the automatic or self-backwashing type wherein the filter bed is backwashed by treated liquid stored with the filter tank. This invention is directed toward a means for automatically starting the backwashing cycle when a predetermined head loss is achieved across the filter bed and for automatically stopping the backwashing cycle. The embodiment of the invention herein described has particular reference to the field of water treatment.

A typical method of filtration is to pass untreated water through a filter chamber having a filter bed of sand or other granular material. Raw or untreated water is introduced into the inlet side of the filter chamber and as the liquid courses through the filter bed, suspended matter in the water is removed. The treated water then escapes from the outlet slide of the filter chamber through a suitable false bottom in the filter chamber. The false bottom is designed to retain the filter bed but allow the filtered water to pass. The treated water then passes to service via an underdrain and suitable conduits.

After a period of time the interstices in the filter bed become clogged and fouled with the foreign material extracted during filtration. The filter thus becomes less efficient. This decrease in efficiency of the filter can be measured in terms of head loss or increased pressure drop across the filter bed. Thus, as the filter bed becomes clogged, the pressure differential between the upstream side of the bed and the downstream side increases. The measure of head loss then can be used as a means to determine when the filter bed should be cleaned.

One method of cleaning filter beds is to backwash the bed with filtered water. This step involves introducing a reverse flow of water through the filter bed to carry the foreign matter extracted during filtration to waste. This backwash step may be accompanied by an air scrubbing step whereby air under pressure is introduced at the downwstream or outlet side of the bed to further agitate the filter bed and assist in the cleansing action of the liquid.

Backwashing may be accomplished in a number of ways. For example, backwash liquid from an external source may be introduced through a distributor located below the filter bed. Gravity feed devices or pumps may also be used. This invention relates to filters wherein the backwash water is stored in a separate compartment within the filter tank itself. This storage compartment is situated above the filter chamber and is in communication with the underdrain compartment. When the backwash cycle is started, the hydrostatic pressure of the water so stored is sufficient to force it down through a connecting conduit into the underdrain compartment and back through the false bottom, through the filter bed and out to waste thus washing the bed.

This invention has particular reference to the kind of filter that is self-cleaned by a supply of water stored in a compartment above the filter chamber and in which the backwashing cycle is initiated and stopped by electrical sensing devices and a single valve.

Filters of the type described may incorporate manual, mechanical, siphon, or float means to initiate the backwashing cycle. Manual means are limited by reason of requiring attendants or operating personnel to open and close the appropriate valves. Mechanical devices such as loss of head gauges are often delicate and subject to failure. Devices incorporating siphons or floats or similar hydrostatic sensing means often require a multiplicity of pipes and tubes. Siphon means have certain design and size limitations which limit flexibility of use. The operation of these devices are also frequently attended by problems of interrupted backwashing arising from entrapped air. This invention overcomes the above limitations in that the design is simple, the operation is positive and reliable, and there are few moving parts.

In the accompanying drawings, a preferred embodiment of my invention is illustrated by way of example, and not for the purpose of limitation. Referring to the drawings.

FIG. 1 is a side elevation showing a partial sectional view of a typical single bed filter unit embodying the present invention showing the liquid levels the circulation patterns during the filtering operation.

FIG. 2 is of the same elevation as in FIG. 1, showing the liquid circulation patterns during the backwash cycle.

Referring to FIGS. 1 and 2, the filter tank is generally denoted as 1. Within the filter tank is a filter chamber generally denoted as 2. The filter chamber 2 is a compartment substantially closed on all sides. The upper area of the filter chamber 2 in the inlet side, denoted generally as 2a and the lower area is the outlet side, denoted generally as 2b. The lower portion 3 is a false bottom having strainers 4 disposed thereon. A filter bed 5 of sand or other filter material is situated above the false bottom 3 and the strainers 4. A transfer conduit 6 for directing raw water into and backwash water out of the chamber 2 is connected at its inner end to the upper portion 7 of the filter chamber 2 and is in communication with the inlet side 2a. Within the filter chamber 2 is a baffle 8 which functions to distribute incoming water evenly across the filter bed 5. Thus, during the service run, water entering through transfer conduit 6, past baffle 8 and into filter chamber 2 can escape only after passing through filter bed 5 and through strainers 4 and out through false bottom 3. The insoluble materials suspended in the incoming liquid are thereby extracted and retained in the filter bed 5.

The filtered water escaping from the outlet side 2b of the filter chamber 2 enters the underdrain compartment 9 and, during the initial stage of the filtering operation gradually rises through the connecting ducts 10 and 10' into a backwash storage compartment 11. Simultaneously the filtered liquid rises in the service outlet riser 12. The backwash storage compartment 11 fills until the water reaches a level equal to that of the service outlet line 13. After the backwash storage compartment 11 is filled, all the treated water goes to service. The liquid in the backwash storage compartment 11 is that which will be used to clean the filter during the backwashing step to be described later.

A high level control pipe 14 is communicably connected at its lower end to the transfer conduit 6. As an alternative, the high level control pipe 14 could also be communicably connected at its lower end to the filter chamber 2 by being affixed to upper portion 7. In either case, the high level control pipe 14 is in communication with the inlet side 2a. At its upper end, which extends above the high water level in the backwash storage compartment 11, the high level control pipe 14 has a high level sensing switch 15 with a probe 16. This switch 15 is excited when water, rising in the high level control pipe 14, contacts the probe 16. The point at which the high level control switch 15 is excited represents a predetermined pressure drop across the filter bed 5. The high level control switch 15 is electrically connected with an electrical actuating means 17. The electrical actuating means 17 is in turn connected to and mechanically controls the opening and closing of a butterfly valve 18.

When the high level sensing switch 15 is excited an electrical impulse is transferred to the electrical actuating means 17 which causes the butterfly valve 18 to open.

A low level sensing switch 19, having a probe 20 located within the backwash storage compartment 11, is excited when liquid in the backwash storage compartment 11 drops to a predetermined level represented by the lower end of the probe 20. The low level sensing switch 19 is also electrically connected with the electrical actuating means 17. When the low level sensing switch 19 is excited, an electrical impulse is transferred to the electrical actuating means 17 which causes the butterfly valve 18 to close.

The butterfly valve 18 is located at the outlet side of a three-way connecting pipe 21 and controls the entry of water into a backwash outlet pipe 23. An inlet pipe 22 is attached to the inlet side of the connecting pipe 21. The third side of connecting pipe 21 is attached to the outer end of the transfer conduit 6. The connecting pipe 21, then forms a common junction with the transfer conduit 6, the inlet pipe 22, and the backwash outlet 23. When the butterfly valve 18 is closed, water entering inlet pipe 22, and through connecting pipe 21, must flow through transfer conduit 6 and into filter chamber 2. When butterfly valve 18 is open, water entering inlet pipe 22 and into connecting pipe 21 will pass through to backwash outlet pipe 23 and so to waste via sump 24. At the same time, during the backwash step to be described below, backwash water from filter chamber 2 will flow through transfer conduit 6, through connecting pipe 21 and so to waste through backwash outlet 23.

During the filtering operation, butterfly valve 18 is closed. Liquid enters inlet line 22, passes through connecting pipe 21, through transfer conduit 6, into filter chamber 2, through filter bed 5 and strainers 4, out through false bottom 3 and into underdrain compartment 9. The treated liquid then rises through connecting ducts 10 and 10' and in service outlet riser 12 thereby filling backwash storage compartment 11 up to a level determined by the location of service outlet line 13. Incoming liquid also rises in high level control pipe 14.

As the filtering operation continues, suspended material extracted from the feed liquid is deposited through the filter bed 5 thereby tending to fill the interstices in the filter bed 5. As this foreign matter accumulates, the filter becomes less efficient and the pressure differential across the filter bed 5 increases. With this increase, water tends to back up in the high level control pipe 14. Thus, the column of water in the high level control pipe 14 above the level of the water in the backwash storage compartment 11 represents the loss of head or pressure differential across the filter bed 5. As the filter operation continues the level of liquid in the high level control pipe 14 continues to rise due to the increasing pressure drop across the filter bed 5. The probe 16 of the high level sensing switch 15 is situated in the high level control pipe at a point representing the maximum head loss desired for the efficient operation of the filter. At the point of maximum allowable head loss the water in the high level control pipe 14 contacts the probe 16 and excites the high level sensing switch 15 thereby operating electrical actuating means 17 which in turn opens butterfly valve 18. This starts the backwashing cycle.

The butterfly valve 18 having opened, the hydrostatic pressure of the water in the backwash storage compartment 11 is sufficient to force the backwash water through the connecting ducts 10 and 10' into the underdrain compartment 9 up through the false bottom 3, through the strainers 4, upward through the filter bed 5, out through the transfer conduit 6, through the connecting pipe 21, through butterfly valve 18 and down through the backwash outlet 23 and into sump 24. The force of the backwashing water acts to clean the filter bed 5 of the foreign material there deposited. The backwashing cycle is ended when the level of the water in the backwash storage compartment 11 reached a predetermined point, represented by the lower end of probe 20. At this point low level sensing switch 20 is excited and operates the electrical actuating means 17 which in turn closes the butterfly valve 18. The water thus entering the inlet pipe 22 again enters the filter chamber 2 via transfer conduit 6, thereby repeating the filter cycle.

The embodiment here described has reference to a filter tank with one chamber only. This is not meant to be restrictive. The invention may be practiced in a filter tank having two or more filter chambers. A multiple chamber filter is in fact more desirable since down-time resulting from backwashing is lessened. In such filters, one filter bed can be backwashed while the other chambers are being used for service. Further, the continuing flow of filtered water from the filter chambers still in service assists in the backwashing of the chamber being cleaned.

It is also possible to supplement the cleaning action of the backwash water with an air scrubbing step. In such case, a timer means, operating in association with the actuating means, could be set to allow the introduction of compressed air into the backwash water at an interval after the backwash step has begun.

To further illustrate the invention a specific example of the method in actual operation will be described. This example has reference to a multi-chambered filter.

A filter, twelve feet in height and having three filter compartments, was run in service of filtering chemically coagulated and settled Mississippi River water. Each compartment or chamber was substantially closed with the exception of an opening for feed liquid and each had a false bottom to hold a filter bed yet allow the escape of treated liquid. The false bottoms were provided with strainers. Deposited upon each false bottom was a filter bed of sand having a cross sectional area of 37.7 sq. ft. Unfiltered water entered through an opening in the top of each of the chambers via transfer conduits. The transfer conduits were connected in communication at their other ends to inlet pipes and to backwash outlet pipes. The backwash outlet pipes were equipped with butterfly valves.

Beneath the false bottoms of the filter chambers was a common underdrain compartment which communicated to service by means of a service outlet pipe.

Located above the filter chambers, and within the filter tank itself, was a backwash storage compartment. This storage compartment was in communication with the underdrain compartment via vertical connecting ducts. During the filtering process, raw water entered the inlet pipes at the rate of 180 g.p.m., was conveyed through the transfer pipes into the various filter chambers, each filter chamber thus receiving a flow of 60 g.p.m. As the raw water, which had the turbidity of 5 p.p.m. passed through the sand beds, the suspended foreign matter was removed. The turbidity of the filtered water was negligible.

The filtered water then filled the underdrain compartment and rose, through the connecting ducts, into the backwash water storage compartment. When the level of about 41 inches was reached in the backwash storage compartment, the storage compartment was full and all the filtered water thereafter passed to service.

Each transfer conduit had located thereon a high level control pipe which communicated at its lower end with water in the transfer pipe. The high level control pipes extended above the top of the filter tank and above the level of the water in the backwash storage compartment. At its upper end, each high level control pipe had high level sensing switches, each equipped with a probe.

As the filter bed in a given filter chamber became fouled, the pressure differential across the filter bed increased, thus causing the water in the corresponding high level control pipe to back up above the level of the water in the backwash storage compartment.

After about 36 hours of operation from the previous backwash, the water rose in the high level control pipe for the No. 1 filter compartment to a level where it contacted the probe of the high level sensing switch. This caused an electrical impulse to be sent through interconnecting wires to an electrical actuating means which caused the butterfly valve in the backwash outlet communicating with the No. 1 compartment to open.

Upon the opening of the butterfly valve, the backwash cycle commenced. The pressure of the water standing in the backwash water storage compartment forced it to flow down through the connecting ducts, into the underdrain and back through compartment No. 1 thus cleaning the bed. Simultaneously, because of the continued operation of compartments No. 2 and No. 3, filtered water from these two compartments also added to the backwash flow.

The total backwash time was four minutes, during which time the level in the storage compartment dropped from about 41 inches to about 14 inches. The cycle was ended by the excitement of a low level sensing switch having a probe extending downward in the backwash storage compartment. This switch was also electrically connected to the electrical actuating means and caused the butterfly valve to close.

During the four minutes required to backwash, 2,400 gallons of water flowed back through the No. 1 compartment. Of this total, 1,920 represented backwash water from the storage compartment, 480 gallons water from the No. 2 and No. 3 chambers. The average backwash rate was 600 g.p.m., which translated to area was 15.9 g.p.m./sq. ft.

The backwash cycle having ended, 11 minutes were required to refill the storage compartment and bring the No. 1 compartment back to service.

We claim:

1. A filter of the self-backwashing type having a filter tank, at least one filter chamber, having an inlet and outlet side, a backwash storage compartment, means connecting said backwash storage compartment with the outlet side of said filter chamber, an inlet pipe, a service outlet communicating with the outlet side of said filter chamber, a backwash outlet pipe, a transfer conduit in communication at its one end with the inlet side of said filter chamber and in common communication at its other end with said inlet pipe and said backwash outlet pipe, and a means for automatically controlling a backwash cycle, said means comprising a valve for controlling the flow of liquid through said backwash outlet pipe, an electrical actuating means for opening and closing said valve, a high level control pipe in communication with the inlet side of said filter chamber, a high level sensing switch disposed within said high level control pipe and electrically connected to said actuating means whereby liquid rising to a predetermined height in said high level control pipe and contacting said high level sensing switch causes said valve to open thereby initiating said backwash cycle, and a low level sensing switch disposed within said backwash storage compartment electrically connected to said actuating means whereby liquid in said backwash storage compartment falling below a predetermined level excites said low level sensing switch thereby causing said valve to close and ending said backwash cycle.

2. The filter of claim 1 wherein said transfer conduit is below a level of backwash liquid which will accumulate in said backwash storage compartment as said liquid is being passed through said filter chamber.

3. In a filter of the self-backwashing type having at least one filter chamber, said filter chamber having a inlet and an outlet side, a backwash storage compartment, means connecting said backwash storage compartment with the outlet side of said filter chamber, a transfer conduit connected at its one end to the inlet side of said filter chamber, a common juncture at which the other end of said transfer conduit an inlet pipe and a backwash outlet pipe are communicably connected with each other, a means for initiating and ending a backwash cycle comprising a high level control pipe having its lower end in communication with the inlet side of said filter chamber, a high level sensing switch located near the top of said high level control pipe such that liquid rising in said high level control pipe excites said high level sensing switch when a predetermined level is reached, a low level sensing switch located within said backwash storage compartment such that said low level sensing switch is excited when the liquid in said storage compartment reaches a predetermined low level, a butterfly valve located in said backwash outlet pipe whereby the flow of liquid through said transfer conduit, said inlet pipe and said backwash outlet pipe is controlled, electrical actuating means connected to said butterfly valve and electrically connected to said high level and low level switches whereby the excitement of said switches causes said butterfly valve to open and close thereby initiating and ending said backwash cycle.

4. A filter comprising at least one filter chamber having in inlet and outlet side with a filter bed therebetween, a backwash storage compartment extending above said filter chamber, an underdrain compartment extending below said filter chamber, at least one connecting duct connecting said underdrain compartment with said backwash water storage compartment, a service outlet connected to said underdrain compartment, a transfer conduit having an inlet end communicably connected to the inlet side of said filter chamber and an outlet end communicably connected to an inlet pipe, a backwash outlet communicably connected to the juncture of said inlet pipe and said transfer conduit, a butterfly valve disposed in said backwash outlet and controlling the flow of liquid therethrough, an electrical actuating means connected to said butterfly valve is opened and closed, a high level control pipe communicably connected at its lower end to said transfer conduit, a high level sensing switch disposed near the upper end of the said high level control pipe at a point representing the greatest allowable head loss permissible in the filter, said high level sensing switch being electrically connected to said actuating means, whereby liquid rising in said high level control pipe and coming in contact with said high level sensing switch excites said high level sensing switch thereby causing said butterfly valve to open, a low level sensing switch disposed within said backwash water storage compartment such that the lower end of said low level sensing switch delimits the lowest liquid level desired in said backwash water storage compartment, said low level sensing switch in turn being connected electrically to said actuating means whereby liquid in the backwash storage compartment reaching the lowest level desired excites said low level sensing switch causing said butterfly valve to close.

5. A filter of the self-backwashing type having a filter tank, a filter chamber having an inlet and an outlet side, a backwash storage compartment above said filter chamber, means connecting said backwash storage compartment with the outlet side of said filter chamber, an inlet pipe, a service outlet communicating with the outlet side of said filter chamber, a backwash outlet pipe, a transfer conduit having one end communicating with the inlet side of said filter chamber and another end communicating with said inlet pipe and said backwash outlet pipe, and means for automatically controlling a backwash cycle wherein backwash liquid from said backwash storage compartment is passed through said filter chamber from said outlet side to said inlet side, said backwash control means comprising means to control the flow of liquid through said transfer conduit, a high level control pipe means communicating with the inlet side of said filter chamber, a high level sensing switch means disposed within said high level control pipe means and electrically connected to said means to control the flow of liquid through said transfer conduit whereby liquid rising to a predetermined height in said high level control pipe means and contacting said high level sensing switch means causes said means to control the flow of liquid through said transfer conduit to initiate said backwash cycle, and a low level sensing switch means disposed within said backwash storage compartment electrically connected to said means to control the flow of liquid through said transfer conduit whereby backwash liquid in said backwash storage compartment falling below a predetermined level excites said low level sensing switch thereby causing said means to control the flow of liquid through said transfer conduit to terminate said backwash cycle.

6. The filter of claim 5 wherein said service outlet extends upwardly to a level above said transfer conduit and below said high level sensing switch means.

7. The filter of claim 5 wherein said means to control the flow of liquid through said transfer conduit comprises a valve means which is opened and closed by said high level sensing switch means and said low level sensing switch means.

8. A filtering apparatus comprising a filter chamber having an upper inlet side and a lower outlet side, a storage chamber above said filter chamber for storing effluent, means connecting said storage chamber with said outlet side of said filter chamber, said storage chamber receiving said effluent from said outlet side of said filter chamber to raise the level of stored effluent from a lower level to an upper level, pipe means communicating with said inlet side of said filter chamber, means connecting said pipe means to a source of liquid to be filtered, service outlet means for said effluent, said service outlet means communicating with said storage chamber, the height of said service outlet means controlling the upper level of said effluent in said storage chamber, said pipe means having a height less than the height of said lower level of the stored effluent to provide for the flow of said stored effluent through said filter chamber by virtue of the force created by a head of the stored effluent above said pipe means, said pipe means being connected to a backwash liquid outlet pipe, valve means to open and close said backwash liquid outlet pipe and to terminate the flow of said effluent at said lower level, when said backwash liquid outlet pipe is closed said liquid to be filtered passing into said filter chamber and when said backwash liquid outlet pipe is open effluent passing through said filter chamber from said storage chamber.

9. The filtering apparatus of claim 8 wherein said valve means, filter chamber, pipe means and backwash outlet pipe are arranged to prevent said liquid to be filtered from passing into said filter chamber when said chamber is being backwashed by effluent from said storage chamber.

10. A filter of the self-backwashing type having a filter tank, a filter chamber having an inlet and an outlet side, a backwash storage compartment above said filter chamber, means connecting said backwash storage compartment with the outlet side of said filter chamber, an inlet pipe, service outlet means communicating with the outlet side of said filter chamber, a backwash outlet pipe, a transfer conduit having one end communicating with the inlet side of said filter chamber and another end communicating with said inlet pipe and said backwash outlet pipe, and means for automatically controlling a backwash cycle wherein backwash liquid from said backwash storage compartment is passed through said filter chamber from said outlet side to said inlet side, said backwash control means comprising valve means to open and close said backwash outlet pipe, means responsive to the pressure in said inlet side of said filter chamber connected to said valve means, said pressure responsive means causing said valve means to open said backwash outlet pipe when the pressure in said inlet chamber reaches a predetermined pressure and to initiate said backwash cycle, and means responsive to the level of backwash liquid in said backwash storage compartment, said level responsive means causing said valve means to close when the level of backwash liquid in said backwash storage compartment falls below a predetermined level and to thereby terminate said backwash cycle.

11. The filtering apparatus of claim 8 wherein said service outlet means for said effluent comprises an effluent pipe communicating with said outlet side of said filter chamber, said effluent pipe extending upwardly a predetermined height above said pipe means and providing a flow path for the effluent from said filter chamber, the uppermost level of said flow path determining the level of the effluent in said storage chamber which will accumulate in said storage chamber as said liquid is being filtered.

References Cited by the Examiner

UNITED STATES PATENTS

| 2,457,903 | 1/49 | Kantor et al. | 137—392 |
| 2,879,891 | 3/59 | Beohner et al. | 210—275 X |
| 2,879,893 | 3/59 | Stebbins | 210—108 |
| 3,111,486 | 11/63 | Soriente | 210—108 |

References Cited by the Applicant

UNITED STATES PATENTS

| 377,387 | 2/88 | Jewell. |
| 395,625 | 1/89 | Moore. |
| 604,615 | 5/98 | Hitchcock. |
| 879,112 | 2/08 | Miller. |
| 1,119,008 | 12/14 | Gibson. |
| 1,142,270 | 6/15 | Reisert. |
| 2,270,924 | 1/42 | Blair. |

FOREIGN PATENTS

| 24,526 | 1893 | Great Britain. |
| 246,264 | 9/47 | Switzerland. |
| 290,285 | 8/53 | Switzerland. |

REUBEN FRIEDMAN, *Primary Examiner.*

HERBERT L. MARTIN, *Examiner.*